(12) United States Patent
Malackowski et al.

(10) Patent No.: US 9,058,628 B2
(45) Date of Patent: Jun. 16, 2015

(54) MARKETPLACE FOR TRADING INTANGIBLE ASSET DERIVATIVES AND A METHOD FOR TRADING INTANGIBLE ASSET DERIVATIVES

(75) Inventors: James E. Malackowski, Chicago, IL (US); Keith M. Cardoza, Chicago, IL (US); Susan L. Aylward, Chicago, IL (US); Cameron Gray, Chicago, IL (US)

(73) Assignee: Ocean Tomo, LLC, Chicago, IL (US)

( * ) Notice: Subject to any disclaimer, the term of this patent is extended or adjusted under 35 U.S.C. 154(b) by 1124 days.

(21) Appl. No.: 12/312,886

(22) PCT Filed: Nov. 29, 2007

(86) PCT No.: PCT/US2007/024525
§ 371 (c)(1),
(2), (4) Date: Sep. 21, 2009

(87) PCT Pub. No.: WO2008/066860
PCT Pub. Date: Jun. 5, 2008

(65) Prior Publication Data
US 2010/0030680 A1    Feb. 4, 2010

Related U.S. Application Data

(60) Provisional application No. 60/867,767, filed on Nov. 29, 2006.

(51) Int. Cl.
G06Q 40/06    (2012.01)
G06Q 40/00    (2012.01)
G06Q 40/04    (2012.01)
G06Q 10/10    (2012.01)

(52) U.S. Cl.
CPC .................................. *G06Q 40/04* (2013.01)

(58) Field of Classification Search
CPC ....... G06Q 40/06; G06Q 40/00; G06Q 40/04; G06Q 10/10; G06Q 20/10; G06Q 50/184
USPC ........... 705/1, 4, 10, 35, 36, 36 R, 37, 38, 39, 705/310; 702/181; 707/102
See application file for complete search history.

(56) References Cited

U.S. PATENT DOCUMENTS

| | | | | |
|---|---|---|---|---|
| 6,175,824 | B1 * | 1/2001 | Breitzman et al. | 705/36 R |
| 6,556,992 | B1 * | 4/2003 | Barney et al. | 1/1 |
| 7,493,262 | B2 * | 2/2009 | Hagelin | 705/310 |
| 2002/0002523 | A1 * | 1/2002 | Kossovsky et al. | 705/36 |
| 2002/0007335 | A1 * | 1/2002 | Millard et al. | 705/37 |

(Continued)

OTHER PUBLICATIONS

Sanjoy Bose et al. An empirical evaluation of option pricing in intellectual capital. Journal of Intellectual Capital; 2003; 4, 3; ABI/INFORM Global, pp. 382-395.*

*Primary Examiner* — Barbara Joan Amelunxen
(74) *Attorney, Agent, or Firm* — Valauskas Corder LLC (57) ABSTRACT

A marketplace for trading derivative financial contracts includes a forum that publishes a financial contract and allows the financial contract to be traded by one or more market participants. The financial contracts are based on one or more underlying intangible assets of one or more entities. The price of the contract is derived from a measure of value of the one or more underlying assets of the particular financial contract. The forum may include an exchange for trading financial contracts and may also host trading of over-the-counter financial contracts.

17 Claims, 6 Drawing Sheets

(56) References Cited

U.S. PATENT DOCUMENTS

| | | |
|---|---|---|
| 2002/0040338 A1* | 4/2002 | Sick et al. .................... 705/37 |
| 2002/0055897 A1* | 5/2002 | Shidler et al. ................ 705/35 |
| 2002/0072958 A1* | 6/2002 | Yuyama et al. .............. 705/10 |
| 2002/0087448 A1* | 7/2002 | Wilkinson .................... 705/36 |
| 2003/0009415 A1* | 1/2003 | Lutnick et al. ............... 705/37 |
| 2003/0036945 A1* | 2/2003 | Del Vecchio et al. ........ 705/10 |
| 2004/0010393 A1* | 1/2004 | Barney ........................ 702/181 |
| 2004/0236676 A1* | 11/2004 | Takezawa et al. ........... 705/38 |
| 2005/0010481 A1* | 1/2005 | Lutnick et al. ............... 705/26 |
| 2005/0080705 A1* | 4/2005 | Chaganti ...................... 705/36 |
| 2005/0261927 A1* | 11/2005 | Bilak et al. ................... 705/1 |
| 2006/0100948 A1* | 5/2006 | Millien et al. ................ 705/35 |
| 2006/0122849 A1* | 6/2006 | Masuyama et al. .......... 705/1 |
| 2006/0259315 A1* | 11/2006 | Malackowski et al. ...... 705/1 |
| 2007/0027787 A1* | 2/2007 | Tripp ............................ 705/36 |
| 2007/0078886 A1* | 4/2007 | Rivette et al. ................ 707/102 |
| 2007/0150298 A1* | 6/2007 | Barney .......................... 705/1 |
| 2008/0133396 A1* | 6/2008 | De La Motte ................ 705/37 |
| 2008/0215474 A1* | 9/2008 | Graham ........................ 705/37 |
| 2008/0288418 A1* | 11/2008 | Weiss et al. .................. 705/36 R |
| 2009/0106140 A1* | 4/2009 | De La Motte ................ 705/37 |
| 2009/0259506 A1* | 10/2009 | Barney .......................... 705/7 |
| 2009/0287507 A1* | 11/2009 | van Breda et al. ........... 705/4 |
| 2009/0299894 A1* | 12/2009 | Chorna et al. ................ 705/37 |
| 2009/0307148 A1* | 12/2009 | Cardoza et al. .............. 705/36 R |
| 2010/0030680 A1* | 2/2010 | Malackowski et al. ...... 705/37 |
| 2011/0071938 A1* | 3/2011 | Rothschild ................... 705/37 |

* cited by examiner

| Underlying Index | Nanotechnology Market Value Index (NNTB) |
|---|---|
| Contract Issue Date | January 15, 2007 |
| Ticker Symbol | NNTB-H-08 |
| Contract Size | Each contract shall settle for $10 times the published Nanotechnology Market Value Index as reported by the recognized performance metric publisher on the index publication date. |
| Last Trading Date | Trading in expiring contracts ceases at 12:00 noon ET on the index publication date. |
| Index Publication Date | Third Tuesday of March, 2008 at 3:00 pm ET. |
| Last Delivery Date | Cash settlement shall be made by 5:00 pm ET on the index publication date. |
| Primary Exchange | The Exchange |
| Position limits | 5,000 contracts |

MARKETPLACE FOR TRADING INTANGIBLE ASSET DERIVATIVES AND A METHOD FOR TRADING INTANGIBLE ASSET DERIVATIVES

CROSS REFERENCE TO RELATED APPLICATIONS

This application claims the benefit of U.S. Provisional Application No. 60/867,767, filed Nov. 29, 2006, the entire disclosure of which is incorporated in its entirety herein by reference thereto.

BACKGROUND OF THE INVENTION

1. Field of the Invention

The present invention relates generally to trading of financial contracts and other trading products, and more particularly, to a marketplace and a method for trading intangible assets and/or derivative financial contracts based on such intangible assets.

2. Background Art

A traditional securities exchange or futures exchange is an organized marketplace for buyers and sellers of listed securities to come together to make trades in those securities. The securities are bought and sold in a forum where price is determined through supply-demand mechanisms. The types of securities traded on a securities or futures exchange include, for example, stocks, bonds, stock options, futures, unit trusts, and other pooled investment products. Trade on a securities exchange is by members, or stock brokers, and stock and share holders. New issues of stocks and bonds are first offered to investors in a part of the securities markets referred to as the primary market, with subsequent trading occurring in the secondary market, where an investor purchases a security from another investor. Although there is generally no requirement of issuing stock or trading stock through the stock exchange, a stock exchange provides a centralized, ready market for the exchange of securities. For instance, bonds are usually traded "off exchange" or over-the-counter. The influence of technology on modern markets is reflected in the recent trend towards using electronic networks for securities trading, which may offer faster transactions at reduced costs, without the assistance of a specialist as an intermediary.

In order for companies to be listed and/or traded on a particular securities exchange, they must meet the listing and/or trading requirements of that exchange. The listing requirements, generally set by an exchange's board of governors, refer to the set of conditions imposed upon companies that want to be listed and/or traded on that exchange. Among the dozens of securities exchanges around the world, the listing requirements vary and reflect criteria such as minimum number of shares outstanding, minimum market capitalization, and minimum annual income. For example, companies must meet specific financial and liquidity requirements to have their securities listed on the NASDAQ Global Select Market™. For the financial requirements, a company must meet all of the criteria under at least one of three detailed financial standards, each one mandating requirements under pre-tax earnings, cash flows, market capitalization, revenue, bid price, market makers, and corporate governance. The three specific liquidity requirements involve the number of beneficial shareholders, publicly held shares, and market value of publicly held shares. Furthermore, companies must meet requirements for continued inclusion. The New York Stock Exchange ("NYSE") has its own minimum quantitative standards of distribution and size criteria and financial criteria. To be listed on the NYSE, a company must have 2,000 holders of a unit of trading or 2,200 total shareholders, together with an average monthly trading volume of 100,000 shares or 500 total shareholders, together with an average monthly trading volume of 1 million shares, 1.1 million outstanding public shares, and a market value of public shares being $100 million for public companies and $60 million for initial public offerings ("IPOs"), spin-offs, carve-outs and affiliated companies. When a company falls below any criterion, the NYSE will review the appropriateness of continued listing.

Among an individual or corporation's assets are any item (s) of monetary value or resources with economic value. Tangible assets are those of a physical form, such as machinery, factories, buildings, land, and inventory. Those assets without tangible, physical substance are termed intangible assets, which as used herein include intellectual property ("IP") assets. IP assets, as used herein, include patents, trademarks, copyrights and trade secrets, patent and trademark applications, business methodologies as well as research and development, inventions, discoveries, improvements, modifications, enhancements, technologies, methods and production/process information know-how, expertise, algorithms, compositions, data, works, concepts, designs, ideas, prototypes, writings, notes, and licenses of intellectual property. Non-IP intangible assets may include customer contact lists and goodwill, for example.

Within the last quarter century, IP has emerged as the leading asset class within corporate America. The United States economy has experienced a shift from manufacturing to services, with the traditional labor and industrial based economy rapidly transitioning to a knowledge-based economy. In 1975, more than 80% of the market value of companies within the S&P 500® consisted of tangible assets. By 2005, less than 20% of the companies' market value was composed of tangible assets. Subsequent to the evolution from a manufacturing base to a service base, the United States has entered into a phase of economic activity where value is captured primarily through IP and the proprietary position it offers. IP is shifting from a tool to protect knowledge and technology to an asset class that can provide liquidity for innovation.

Historically, IP trading has been highly inefficient and generally limited to single or infrequent private transactions. The IP marketplace includes any entity that uses knowledge assets as a competitive advantage. Among the market players are inventors, both individual and corporate, Patent Licensing Enforcement Companies ("P-LECs"), investors, third party valuation experts, and brokers. The market has predominantly relied on the inefficient method of hand-to-hand sale or license of IP, a process that can take years for buyers and sellers. This method is discouraging and inhibits many companies from becoming actively involved in the exchange of IP.

The majority of IP is transacted by IP holding companies of Fortune 500 firms located across the United States. Since most of these firms transfer IP in privately negotiated transactions that take place in several face to face meetings, the time, energy, and money involved in transacting IP is very high. Additionally, the process of negotiating licenses for IP rights often takes place in a disorganized manner. As a result of these inefficient and infrequent transactions, the price discovery and transparency of the IP asset class is very poor. Accounting rules and procedures for reporting on the value of IP in most financial statements further obfuscate the value of IP. Generally speaking, IP is only reported on financial statements if it is acquired (as opposed to being developed internally). Further, the records of patent and trademark ownership listed by the United States Patent & Trademark Office may not always be current, and since a majority of IP transactions tend to be private, the parties and terms of IP licenses are often unknown.

Therefore, what is needed is a marketplace for trading the intangible assets of companies or other entities and derivative financial contracts based on such intangible assets, so as to make IP transactions more efficient, transparent, and economical, and to make IP a more meaningful and valuable asset class.

BRIEF SUMMARY OF THE INVENTION

An marketplace for trading intangible assets, derivatives thereof and/or traditional securities of listed/traded entities and a method of selecting the listed and/or traded entities are presented herein. In one embodiment, traditional securities and/or financial products related to intangible assets of entities, are traded in the marketplace. The financial products traded may include products that provide an interest in an intangible asset, including but not limited to intellectual property assets, such as an outright sale of a patent, copyright, or trademark or a sale of license rights to such intellectual property, as well as products that do not provide an interest in the intangible asset. In one embodiment, derivative financial contracts based on underlying intangible asset(s) are traded, allowing investors a liquid investment tool to hedge risk, gaining financial exposure to the intangible assets underlying corporate valuations, as well as allowing financial exposure to breakthroughs or market trends in specific technology areas or industry sectors.

The marketplace may include an exchange with floor trading, electronic trading (which includes voice-brokering), or a combination of both. In one embodiment, the companies or other entities are listed and/or traded on the exchange and must fulfill requirements based on IP metrics that assess the quality and/or value of each entity's IP. These requirements may further include traditional financial asset tests, and in one embodiment, the entities are regularly evaluated for their continued fulfillment of the listing and/or trading requirements. The exchange may routinely report on various aspects of transactions that occur on or off the exchange, including information pertaining to EP transactions. The exchange serves as a trading venue to benefit buyers and sellers of traditional securities of IP-rich entities, as well as the IP-focused products of such entities. IP may thereby be traded on the exchange more cheaply, frequently, and efficiently, with the exchange facilitating the monetization of patents, trademarks, and copyrights through market transactions. An exchange for trading intangible assets and/or securities of these companies in accordance with the present invention will build the identity of these companies as being IP-rich organizations. The costs incurred during private IP transactions would be reduced through trading on the exchange. The transparency and price discovery of IP assets would increase. Furthermore, the exchange would allow for the management of risk associated with IP, thereby reducing the cost of capital.

A method for determining the entities listed and/or traded on the exchange is also presented, and includes selecting entities using IP metrics, and may further include monitoring the IP metrics of these entities. This method may be implemented on a computer system that includes a computer useable medium having a computer program logic recorded thereon for controlling at least one processor. The computer program logic includes computer program code means for implementing the method.

A marketplace for facilitating the trading of derivative financial contracts includes a derivative financial contract that is based on present or future value of an underlying intangible asset of an entity, multiple intangible assets of the entity, or multiple intangible assets of a plurality of entities. The marketplace further includes a forum, wherein the forum publishes for trading the financial contract and allows one or more participants to trade the financial contract. A participant may include a seller offering to sell the financial contract and/or a buyer seeking to purchase the financial contract. The forum may be an electronic forum for allowing electronic trading of the financial contract. In one embodiment, the forum includes an exchange through which the financial contract is traded.

A method for trading of derivative financial contracts related to intangible assets includes the steps of publishing a derivative financial contract having a price based on a value of an underlying intangible asset of an entity, and providing a forum for allowing a one or more participants to trade the financial contract. The method may further include the step of determining a rule that derives the price of the financial contract from the value of the underlying intangible asset, and periodically reporting to the participants the value of the intangible asset underlying the financial contract. The value may be determined using a value metric of the underlying intangible asset. The method may further include the step of reporting to the participants transactional information relating to trading of the financial contract. In one embodiment, the method includes the step of reporting transactional information relating to trading of a financial contract that is traded off the exchange. This method and/or particular steps thereof may be implemented on a computer system that includes a computer useable medium having a computer program logic recorded thereon for controlling at least one processor. The computer program logic includes computer program code means for implementing the method. For example, trades may be executed and tracked using a computer system, and a computer processor may process transactional data relating to trades and display the transactional data to a participant on a display unit. Further, the financial product may be published for trading on a virtual marketplace, whereby participants may trade the financial contract electronically, with the forum being an electronic forum.

Further embodiments, features, and advantages of the present inventions, as well as the structure and operation of the various embodiments of the present invention, are described in detail below with reference to the accompanying drawings.

BRIEF DESCRIPTION OF THE
DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE INVENTION

Figure 1:
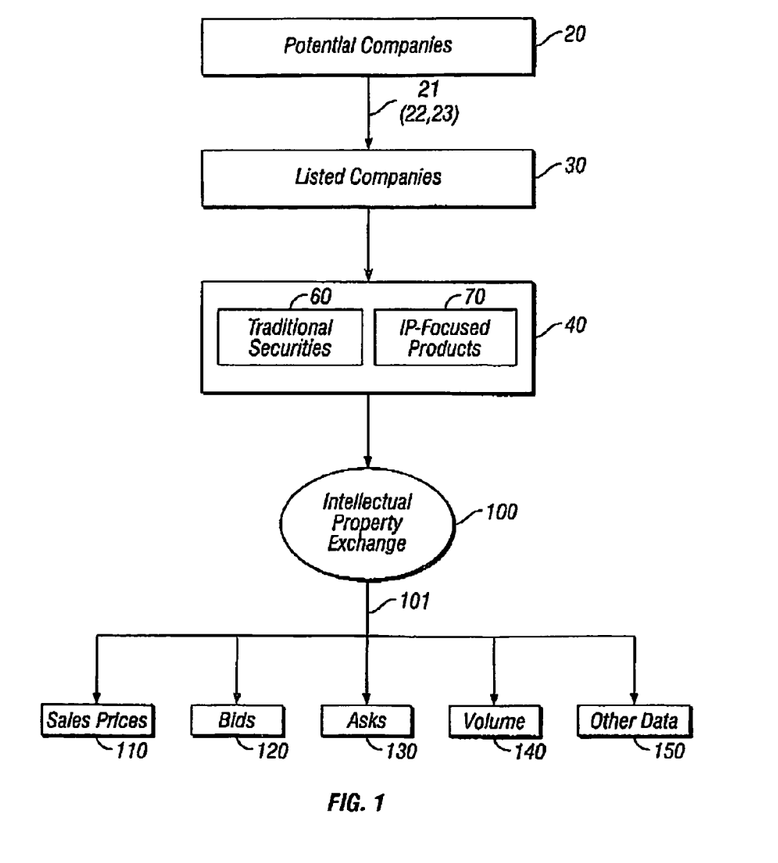
FIG. 1 is a schematic of components of an exchange in accordance with an embodiment of the present invention.

FIG. 1 illustrates components included in an intellectual property exchange 100 according to an embodiment of the present invention. In FIG. 1, listed companies 30 or other entities (hereinafter collectively referred to as "companies") listed on intellectual property exchange 100 are selected from a set of potential companies 20 using listing requirements 21. Targeted potential companies 20 for listing on intellectual property exchange 100 may include domestic and/or international corporations, with significant IP assets, and may further be representative of particular economic or technology sectors, as will be further described below with reference to FIG. 2. Potential companies 20 may also be companies with IP holding companies and management offices. Listing requirements 21 include criteria based on IP metrics 23 to be satisfied by listed companies 30. IP metrics 23 are measures of quality and/or value of the IP assets of companies. In one embodiment, listed companies 30 must meet listing requirements based on traditional financial asset tests 22 in addition to those requirements based on IP metrics 23. Assets 40 are traded on intellectual property exchange 100 and may include traditional securities 60 and intangible assets, such as IP-focused products 70. The term 'IP-focused products' is used herein to refer to tradable products tied to a company's IP assets, as detailed below. Intellectual property exchange 100 may provide reporting 101 of transactional information relating to exchanges of traditional securities 60 and/or IP-focused products 70 or other intangible assets. For example, sales prices 110, bids 120, asks 130, volume 140, and any other transactional data 150 may be reported on one or more products traded on and/or off intellectual property exchange 100. Further details of these components of exchange 100 are described below.

In one embodiment, listing requirements 21 for determining listed companies 30 are based solely on the quality, value and/or nature (or type) of their IP assets, using one or more IP metrics 23 to assess each company's IP assets. Accordingly, listed companies 30 qualify for intellectual property exchange 100 based on their underlying IP. As such, listed companies 30 on exchange 100 should be companies having IP assets, though these assets may or may not be traded on intellectual property exchange 100, as further discussed below. In a further embodiment, traditional financial asset tests 22 used by conventional stock exchanges can provide additional criteria for listed companies 30. Such traditional financial asset tests 22 may include, for example, the minimum number of shares outstanding, minimum market capitalization, and minimum annual income. IP metrics 23 may include measures of the value of patents, trademarks, and/or copyrights the value of licensing from patents, trademarks, and/or copyrights, any of the these metrics as a ratio of other available information such as book value, market value, revenue, net income, research and development expenses, etc., the quality of patents, trademarks, and/or copyrights, and the amount of patents, trademarks, and/or copyrights.

For example, IP metrics 23 may include one or more of the following patent rating measures for measuring the quality and/or value of a company's patent portfolio:

Patent Count: The number of in-force U.S. utility patents a company owns.

Patent Age: The average age of in-force patents within a company's portfolio.

Patent Decay Rate: An estimated obsolescence rate approximating a rate at which the identified patents will lose value over time.

Patent Velocity: The quarterly increase or decrease in the number of in-force patents owned by a company.

Patent Flow: The patent velocity divided by an estimate of the number of patents becoming obsolete in a quarter, assuming a given decay rate.

Patent Abandonment Count: The number of patents for which a company fails to a pay a maintenance fee.

Patent Diversification: The diversity of patents within a company's portfolio.

Total Patent Forward Cites: The cumulative total of forward citations to patents within a company's portfolio.

New Patent Forward Cites: The cumulative total of new forward citations to patents within a company's portfolio in a particular quarter.

Average Intellectual Property Quotient (IPQ™) Score: A score which provides a gauge for measuring and comparing patent quality/value based on the cumulative characteristics of patents that make them statistically either more or less likely to produce economic returns, similar to IQ scores used for rating human intelligence (median=100). IPQ™ scores are generated by and publicly available from, Ocean Tomo Patent Ratings, LLC of Newport Beach, Calif.

Patent Maintenance Value (PMV): A particular relative patent value based on statistical probability that a patent or group of patents will be maintained. Ocean Tomo Patent Ratings, LLC generates a PMV called Ocean Tomo Maintenance Value (OTMV). The PMV may incorporate such factors as United States Patent & Trademark Office maintenance data on the patent or group of patents, relative strength/quality scores of the particular patent or group of patents, such as that provided by the IPQ score, and data on abandonment of similar and related patents.

Patent Exchange Value (PEV): A relational value of patents in comparison to all patents, as well as patents within the same classification, which is generated by objectively analyzing the same characteristics/metrics and criteria for all patents. Ocean Tomo Patent Ratings, LLC generates a PEV called Ocean Tomo Patent Exchange Value (OTEV).

Moreover, these or other patent rating measures may be selectively combined, placed in relation to each other, or placed relative to other intangible and/or tangible asset information, including traditional financial asset tests 22, to produce additional IP metrics 23. For example, change in patent abandonment count, ratio of PMV to market capitalization, or ratio of PMV to research and development expenditures may also serve as IP metrics 23.

For the purposes of illustration, a variety of metrics available from Ocean Tomo Patent Ratings have been given herein as example of metrics which may be useful for determining the strength of the intellectual property of a corporation. It will be appreciated that a variety of other metrics (produced by any number of firms) may be used without departing from the scope of the present invention.

As should be apparent, similar rating measures can be constructed for other intangible intellectual property assets. Likewise, other metrics applicable to other intangible assets involved may be constructed so as to provide a measure of quality and/or value of the particular asset. As should also be apparent, a rating measure may be constructed which combines individual rating measures of several types of intangible assets. For example, a combined copyright and trademark rating measure of a particular company may be its market capitalization less the following: tangible and booked intangible assets, estimated value of other intangible assets other than patents, trademarks and copyrights (including subtraction of non-patented technology value, such as patent applications and in-process research and development), and patented technology value (e.g., the patent maintenance value, described above). Moreover, trademark rating measures, copyright rating measures, and patent rating measures may be combined to provide a composite measure of the quality and/or value of a company's intangible intellectual property assets.

Trademark rating measures may be developed from statistics relating to: number and extent of U.S. trademark filings and trademark filings in other countries (which may be further categorized based on trademark class and number of marks owned by the company per class, for example); details in the file history of registered trademarks (such as 'similar' brands applied in refusals during the trademark's prosecution, a declaration of incontestability ("Section 15" filings), and trademark renewals, for example); periodic information on sales related to a trademarked brand; trademarked brand reputation as reflected in consumer polls; frequency that a trademark is searched on the Internet; number of website domain registrations incorporating a trademark and reported traffic to each website; number and extent of similar trademarks owned by others; and/or actual or estimated corporate revenues and profits by brand. Selection of the most relevant statistics as they bear on stock price may be considered by conducting a regression analysis of historical stock price of a brand. Trademark rating measures may also include, for example: dollar values of brands of companies, such as the brand values published and ranked annually by Interbrand/Omnicom Group of New York, measures of brand loyalty, the amount of time a brand has been in use, secondary trademark market data, vulnerability of a brand to counterfeiting and/or dilution, and metrics based on the change in recognition of brands of companies between specific time periods. Further, a trademark rating measure may reflect relative brand power between multiple brands in a known market space. Still another trademark rating measure may reflect a brand's sensitivity to overall performance of a market segment or performance of other brands in that segment (such as by measuring covariance between brands or between brands and market segment).

Brand-owning companies may be identified by reviewing the registered trademarks and trademark applications using the United States Patent & Trademark Office database (www.uspto.gov) and other worldwide data sources. It may then be determined whether these brand owners are publicly traded companies, such as by comparing the name of the trademark owner to a list of publicly traded companies. Once publicly traded, brand-owning companies and their corresponding brands have been identified, the quality and/or value of these brands (i.e., trademark rating measures) may be measured. The relevancy of a trademark rating measure to a brand-owning company's stock price may be gauged by determining what correlations exist, if any, between the company's stock price and the value of the particular trademark rating measure based on historical data. In this manner, it may be determined which trademark rating measure(s) provide useful yardsticks of the quality and/or value of the brands of publicly traded companies.

A similar methodology may be employed to determine publicly traded companies' ownership of copyrights. Copyright rating measures may be based on, for example, revenues attributable to the sale or licensing of copyrighted material, such as software, videos, films, albums, recordings, newspapers, online resources, or other media. The particular ratings associated with a copyright portfolio may depend on, for example, the distribution medium of the sales of the copyrighted work, objective or subjective reviews of the copyrighted work, awards received for the copyrighted work, consumer survey information reflecting the perceived value of the copyrighted work, secondary market data, and/or the vulnerability of the copyrighted work to piracy.

Trade secret ratings may be developed from statistics relating to: Research and Development (R&D) spending, size and strength of a patent portfolio, relationship between past R&D spending and issued patents (for a particular firm or for an industry) relationship between past R&D spending and successful development of commercially viable technology (for a particular firm or for an industry, an independent (objective or subjective) assessment of trade secret value (for example, conducted under a non-disclosure agreement), and/or the vulnerability of a trade secret to theft or inadvertent disclosure.

Composite intellectual capital ratings may be developed from statistics relating to: measures of the intellectual value of a company's employees (for example, number of invited presentations per employee, published journal articles, number of advanced degrees, and so on); quality of a company's training programs; history of successful recruitment and retention of employees; demonstrated regulatory expertise and/or trackrecord of successful contractual relationships.

As another example, an IP metric 23 can be based on whether a company is a constituent of an IP-based index, i.e., an index of securities in which the index constituents are selected and/or weighted by a measure of quality and/or value of the IP assets of constituent entities. Further description of IP-based indices and related indices, can be found in International Appl. No. PCT/US2007/006290, filed Mar. 13, 2007, entitled "Method and System for Generating an Index of Securities", the entire disclosure of which is hereby incorporated herein by reference thereto. For example, possible corporations that qualify for listing on intellectual property exchange 100 may be constituents of the Ocean Tomo 300™ Patent Index, developed by Ocean Tomo, LLC, which is a publicly traded patent index that represents a diversified portfolio of 300 companies that own valuable patents.

Methods and systems for rating/valuing IP assets are described in U.S. Pat. No. 6,556,992 to Barney et al., U.S. Patent Appl. Pub. No. 2004/0010393 to Barney, and U.S. Patent Appl. Pub. No. 2004/0220842 to Barney, the entire disclosures of which are hereby incorporated herein in their entirety by reference thereto. Tools and technology for valuing a company's knowledge assets, such as their patents, include, for example, Ocean Tomo's PatentRatings™ software, developed by Ocean Tomo Patent Ratings, LLC. Such a software platform assesses patents, patent portfolios, and patent related entities in order to evaluate and identify patents and patent portfolios exhibiting the highest probability for economic success. Also, an IP valuation expert external to intellectual property exchange 100 may be used in assessing the value and/or quality of a company's IP.

Listed companies 30 on intellectual property exchange 100 may be regularly evaluated and monitored, routinely and/or on an as needed basis, to ensure their continued fulfillment of listing requirements 21. A certain time period for companies to meet minimum standards may be granted. For those companies that qualify for intellectual property exchange 100, their listing and/or trading on exchange 100 may serve to strengthen their identity as IP-rich organizations. Moreover, since listed companies 30 qualify for exchange 100 using various IP metrics 23, potential investors in listed companies 30 need not undertake their own investigation and valuation of a company's IP assets.

In various embodiments described above, companies are selected for listing on intellectual property exchange 100 on the basis of their IP assets. In other embodiments, some or all of potential companies 20 may be listed on one or more primary exchanges (for example, the New York Stock Exchange or the American Stock Exchange), and companies are selected for trading on intellectual property exchange 100 on the basis of their IP assets. As an example, a company that is not listed on intellectual property exchange 100 may be traded on intellectual property exchange 100. The set of companies traded on intellectual property exchange 100 is selected based on the IP assets of potential companies 20. Various methods described herein for selecting companies for listing on an exchange, such as intellectual property exchange 100, can be used to select companies for trading on the exchange.

Assets 40 traded on intellectual property exchange 100 may include traditional securities 60 and/or IP-focused products 70. Intellectual property exchange 100 may offer electronic (including voice-brokering) and/or floor trading of assets 40. Traditional securities 60 may include conventional stocks, options, and futures, for example. IP-focused products 70 may include, for example, patents, copyrights, trademarks, trade secrets, licenses on patents, copyrights, trademarks, and trade secrets, investment products tied to IP-based indices, including exchange-traded funds ("ETFs") and options on IP-based indices, IP Asset Backed Securities ("ABS") such as patent-backed securities, trademark-backed securities, and copyright-backed securities, securitized interests in IP, IP-backed bonds, license rights, options on patents; trademarks, and copyrights, Patent Investment Trusts ("PIT") (e.g. a Real Estate Investment Trust for patents), Copyright Investment Trusts (e.g. a Real Estate Investment Trust for copyrights), Trademark Investment Trusts (e.g. a Real Estate Investment Trust for trademarks), and futures on any of the aforementioned IP-focused products 70. As should be apparent to one of skill in the art, a license on a patent copyright, or trademark may include a right to other intangible assets that are necessary for the licensee to fully practice the licensed patent, copyright, or trademark. Methods for trading intellectual property rights are described in U.S. patent application Ser. No. 11/405,166, filed Apr. 17, 2006, entitled "An Intellectual Property Trading Exchange and a Method for Trading Intellectual Property Rights", the entire disclosure of which is hereby incorporated herein by reference.

As FIG. 1 illustrates, intellectual property exchange 100 may provide reporting 101 of transactional information relating to trading of assets 40. Reporting 101 of transactions taking place on intellectual property exchange 100 may be sale prices 110, bids 120, asks 130, and volume 140, open interest, depth of market, and any other information 150 on all IP-related transactions, or on one or more types of IP-related transactions. Reporting 101 may further include disclosure of transactional information pertaining to the trade of traditional securities 60. There may also be reporting of IP-related transactions occurring off intellectual property exchange 100. Reporting 101 ensures that information about traded traditional securities 60 and/or IP-focused products 70 are made available to investors or potential investors in listed companies 30 of intellectual property exchange 100 and other market participants, allowing for publication of market statistics, monitoring of the quality of the market, and maintenance of an audit trail of business conducted for regulatory obligation purposes. Investors and potential investors may include both broker dealers as well as individual persons.

Intellectual property exchange 100 may provide a centralized outlet for the exchange of IP, thereby encouraging and facilitating the recognition of IP as an asset to be bought and sold or licensed. In one embodiment, assets 40 are traded electronically, with or without a physical venue. In another embodiment, a physical venue may be used to facilitate the trading of assets 40. A physical venue may include a building or series of buildings, with a trading floor, offices and facilities, which may overlook the trading floor, and room for supporting services and professionals. Intellectual property exchange 100 may also serve as a headquarters for IP holding and management companies, utilizing the proximity and combined knowledge of these firms to increase the efficiency of IP transactions. Further, public equity market makers, patent licensing and enforcement companies, IP law firms, private equity and venture capital partnerships, non-legal IP service providers (such as those providing consulting, IP commercialization outsourcing, IP litigation support and/or valuation), transaction processing and IP brokers, and IP-based trade associations may be stakeholders in exchange 100 and may also locate their headquarters at intellectual property exchange 100. It should be apparent that numerous design layouts for accommodating all of the necessary people, services, and infrastructure of the physical venue for intellectual property exchange 100 may be instituted. The physical venue may include a large, open market space to accommodate scheduled live auctions of IP assets, such as the IP auctions held by Ocean Tomo Auctions, LLC, a traditional trading pit, office suites for the IP holding and management companies of domestic and/or international companies, display screens, relevant scrolls and tickers, phone banks and computer terminal workstations, and any other appropriate facilities.

In a further embodiment, an electronic trading system is combined with a physical trading floor system having floor specialists. A hybrid system for intellectual property exchange 100 that includes both floor trading and electronic trading systems would provide flexibility for traders. Further, having a specialist, or "upstairs trader", in the floor trading system, may allow investors to navigate the trading of assets 40 with greater ease. An electronic trading system may reduce the expenses involved in operating huge trading floors and may increase efficiency by reducing the transaction time for trades, since electronic orders are typically faster than orders through a floor specialist.

Figure 2:
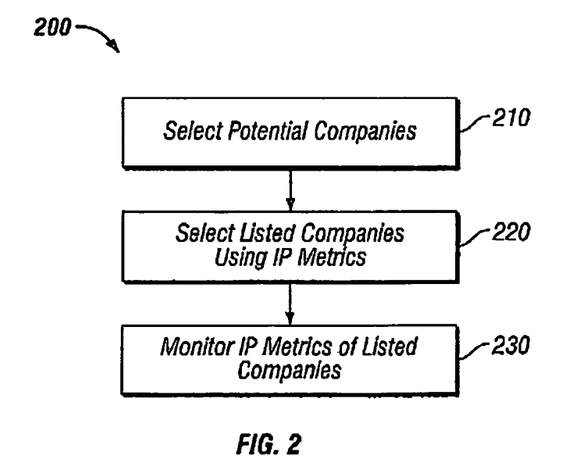
FIG. 2 is a flowchart illustrating a method of determining the entities listed on the exchange in accordance with an embodiment of the present invention.

FIG. 2 illustrates an embodiment of a method 200 of determining listed companies 30 of intellectual property exchange 100. In step 210, potential companies 20 are selected. Potential companies 20 should be companies whose intangible assets include IP assets. A potential company may offer a particular type of IP-focused product 70 and/or traditional security 60 sought to be listed and traded. It should be apparent, however, that the set of potential companies 20 can be small or large. The set of potential companies 20 may be national and/or international corporations, and may further represent one or more specific technology or economic sectors. In step 220, listed companies 30 are selected to be part of intellectual property exchange 100 using IP metrics 23 to assess the quality and/or value of the company's IP assets. Additionally, traditional financial asset tests 22, as discussed above, may be used in determining listed companies 30. The set of listed companies 30 may be the same as the set of potential companies 20, or may be less than all of potential companies 30, depending on the size of the set desired and/or the size of the set that meets listing requirements 21. In step 230, IP metrics 23 as applied to each of listed companies 30 are monitored on a regular, intermittent, or as needed basis (such as for mergers and acquisitions of listed companies). Traditional financial asset tests 22 as applied to listed companies 30, if considered for listing on intellectual property exchange 100, may likewise be monitored. Additionally, companies may be granted a certain time period to meet minimum standards.

Exemplary Computer System

Figure 3:
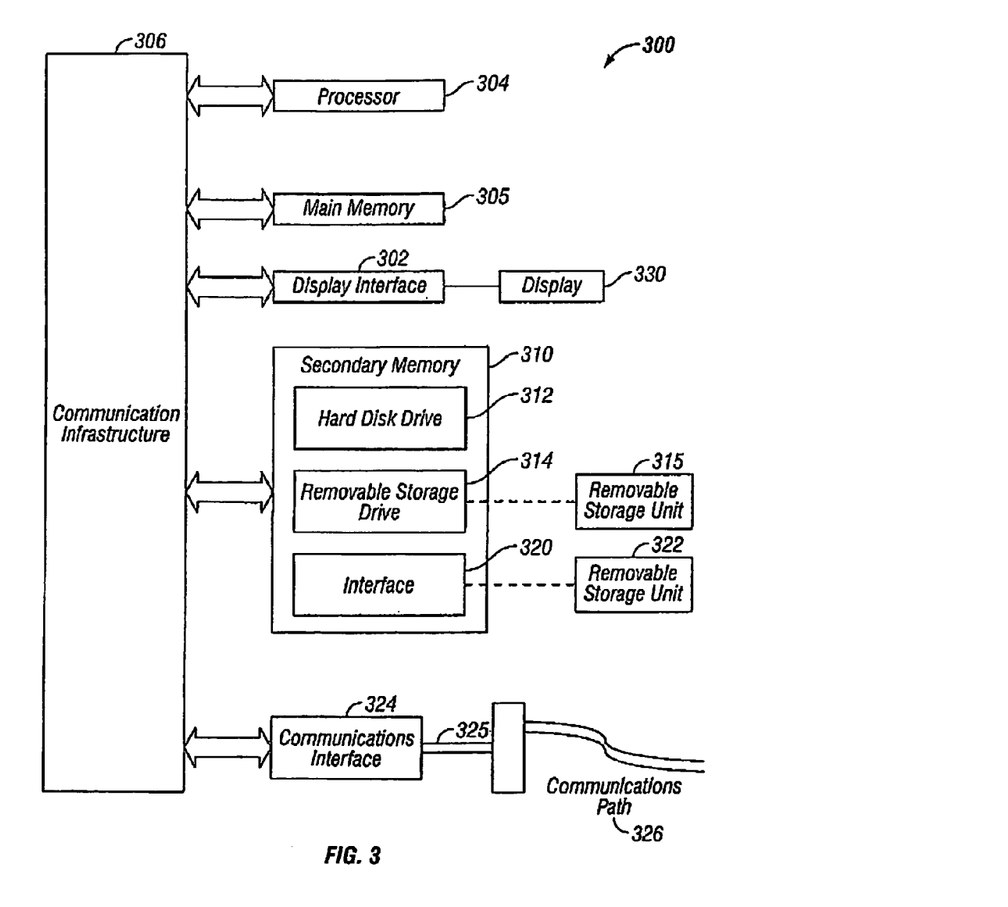
FIG. 3 is an exemplary computer system, in which the methodologies presented herein can be implemented as computer readable code.

One or more computer systems may be used to carry out a method of determining listed companies 30, such as method 200 discussed above with reference to FIG. 2 as described herein, as well as later-described methods for trading IP-focused products. FIG. 3 illustrates an example computer system 300, in which the present invention can be implemented as computer-readable code. Various embodiments of the invention are described in terms of this example computer system 300. After reading this description, it will become apparent to a person skilled in the relevant art how to implement the invention using other computer systems and/or computer architectures.

FIG. 3 illustrates one or more processors, such as processor 304. Processor 304 can be a special purpose or a general purpose digital signal processor. The processor 304 is connected to a communications infrastructure 306 (for example, a bus or network). Various software implementations are described in terms of this exemplary computer system. After reading this description, it will become apparent to a person skilled in the relevant art how to implement the invention using other computer systems and/or computer architectures.

Computer system 300 can include a display interface 302 that forwards graphics, text, and other data from the communication infrastructure 306 (or from a frame buffer not shown) for display on a display unit 330. In one embodiment, display unit 330 may be configured to forward visual and/or auditory information to a user, and may be part of a stationary or mobile electronic device.

Computer system 300 also includes a main memory 305, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 315 in a well known manner. Removable storage unit 315, represents a floppy disk, magnetic tape, optical disk, etc. which is read by and written to by removable storage drive 314. As will be appreciated, the removable storage unit 315 includes a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a PCMCIA slot and card, wired or wireless systems, etc. Software and data transferred via communications interface 324 are in the form of signals 325 which may be electronic, electromagnetic, optical, or other signals capable of being received by communications interface 324. These signals 325 are provided to communications interface 324 via a communications path 326. Communications path 326 carries signals 325 and may be implemented using wire or cable, fiber optics, a phone line, a cellular phone link, an RF link and other communications channels.

In this document, the terms "computer program medium" and "computer usable medium" are used to generally refer to media such as removable storage drive 314, a hard disk installed in hard disk drive 312, and signals 325. These computer program products are means for providing software to computer system 300.

Computer programs (also called computer control logic) are stored in main memory 305 and/or secondary memory 310. Computer programs may also be received via communications interface 324. Such computer programs, when executed, enable the computer system 300 to implement the present invention as discussed herein. In particular, the computer programs, when executed, enable the processor 304 to implement the processes of the present invention, such as the method(s) implemented as described above. These processes may be performed automatically, of invoice some form of manual intervention. Accordingly, such computer programs represent controllers of the computer system 300. Where the invention is implemented using software, the software may be stored in a computer program product and loaded into computer system 300 using removable storage drive(s) 314, hard drive 312 or communications interface 324.

The invention is also directed to computer products (also called computer program products) comprising software stored on any computer useable medium. Such software, when executed in one or more data processing device, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

In accordance one embodiment of the present invention, a marketplace may encompass on-exchange and/or off-exchange trading of IP-focused products or other intangible assets of entities and/or derivative financial contracts based on intangible assets, including but not limited to intellectual property assets. For example, the marketplace may include a forum (operated by a managing entity) that creates derivative financial contracts tailored for over-the-counter trading (e.g., a forward contract) or exchange-trading (e.g., a futures contract). In one embodiment, the forum includes an exchange for trading the contracts. In another embodiment, the forum hosts over-the-counter trading of financial contracts.

The forum may publish one or more financial contracts and allow one or more market participants to trade the one or more contracts. A market participant may be a buyer and/or seller, and a plurality of market participants may trade the contract (s). The plurality of participants may be all buyers, all sellers, or combination thereof. Further, there may exist more buyers than sellers, or more sellers than buyers of the contract(s). The marketplace may be restricted to qualified buyers/sellers of the intangible assets and/or financial contracts. The forum may determine requirements a potential investor (e.g., a broker dealer or individual) must meet in order be a participant in the marketplace, and may also define procedure(s) of trading, to ensure orderly transactions. Exchange participants may be required to meet predefined requirements to own a seat on the exchange and/or trading right.

Figure 4:
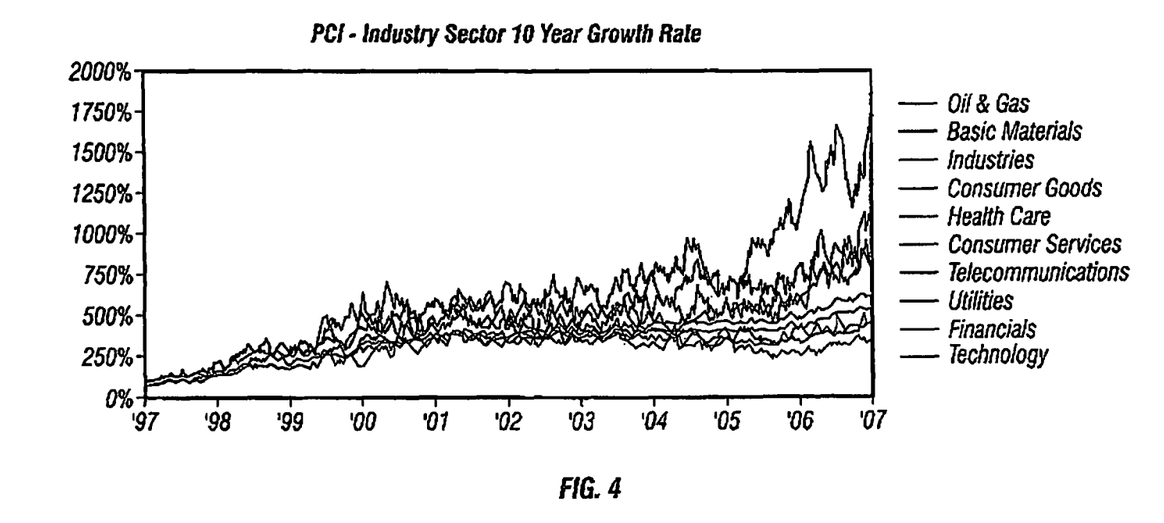
FIG. 4 is a chart representing a historical trend of patent value for patents in ten different industry sectors.

The forum may also determine a rule or rules that the govern how the financial contracts derives its value from the underlying intangible asset. For example, the rule may derive a price of the financial contract from a particular value metric of the underlying intangible asset(s), such as designating that a price at a given time is a product of a value metric and a constant or variable multiplier. In one embodiment, the forum may published the relevant data stream to be used and analyzed by the market participants and potential inventors. For example, the forum may report transactional information relating to trading of the financial contracts on the exchange as well as contracts traded over-the-counter, similar to reporting 101, described above. The forum may offer such reporting to participants as well as potential investors. In one embodiment, the forum periodically reports the value metric for the underlying asset, and buyers/sellers of the financial contract may react to changes in the value metric when trading the financial contract within the marketplace. Where the underlying intangible asset is a trade secret, the value metric, or index, may include a trade secret rating measure, for example. Likewise, where the underlying intangible asset is a patent or a trademark, for example, the value metric may include a patent or a trademark rating measure, respectively. Where the underlying is all patents in a given industry sector, such as may be used in creation of a technology-based futures contract, described below, the value metric may be a cumulative metric reflecting the cumulative value of such patents in the sector. FIG. 4 shows an exemplary chart of changes in ten exemplary cumulative value metrics over a ten year period for respective industry sectors.

In one embodiment, the forum may also assess each published financial contract to indicate a level of investment risk posed by the contract, and the forum may report such assessments to market participants and potential investors. Contract assessments may allow investors or potential investors a convenient tool for gauging the volatility of a contract, the potential return and attendant risk it presents, relative to other financial contracts, and relative to the investor's own investment preferences.

Any financial contract whose price is derived from a value of one or more intangible assets may be a derivative financial contract that may be traded in a marketplace in accordance with the present invention. For example, derivative financial contracts based on intangible asset(s) include, but are not limited to, options, swaps and futures (or forwards) having prices derived from the value of patent(s), trademark(s), and/ or copyright(s), license(s) on patent(s), copyright(s), and/or trademark(s) (including license/sublicense rights contracts described in U.S. patent application Ser. No. 11/405,166), intangible asset indice(s) (e.g., Ocean Tomo 300™ Patent Index, exchange-traded fund(s) ("ETFs") on intangible asset indice(s), IP Asset Backed Security(ies) ("ABS") (e.g. patent-backed securities), trademark-backed security(ies), and copyright-backed security(ies), securitized interest(s) in IP, IP-backed bond(s) (whose underlying may be intellectual property asset(s)). Derivative financial contracts of Patent Investment Trusts ("PIT") (e.g. a Real Estate Investment Trust for patents), Copyright Investment Trusts (e.g. a Real Estate Investment Trust for copyrights), Trademark Investment Trusts (e.g. a Real Estate Investment Trust for trademarks), may also be included.

Figure 5:
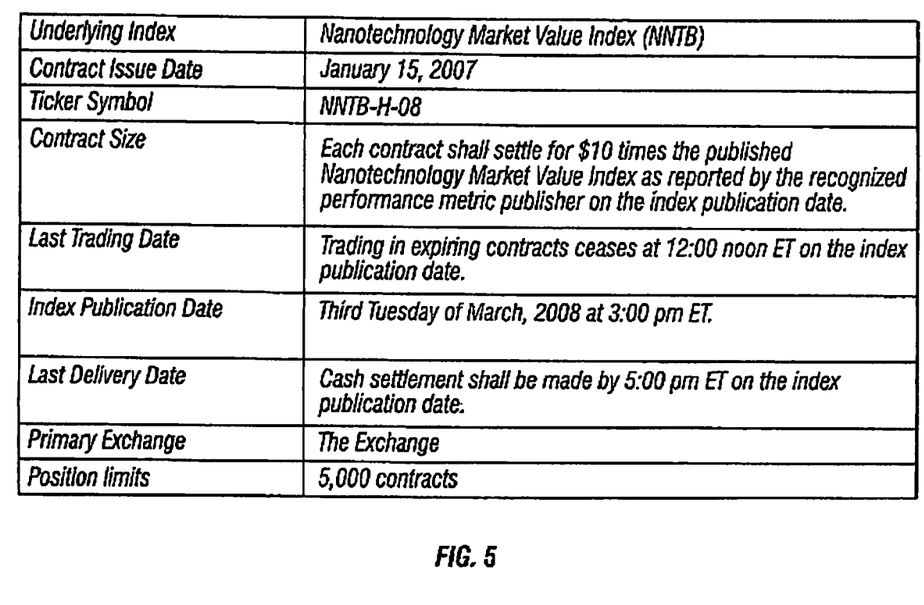
FIG. 5 is a chart of exemplary specifications for a derivative financial contract based on intangible assets, in accordance with an embodiment of the present invention.

One exemplary embodiment of a financial contract that may be traded in a marketplace in accordance with the present invention is a technology-based derivative financial contract whose price depends on the state of a particular technology area at a specified date. This contract could be standardized and published for exchange-trading (e.g., as a futures contract) or may be tailored for over-the-counter trading (e.g., as a forward contract). A price of a technology-based contract may be based on an objective measure of a reference pool (or basket) of patents defining a technology (e.g., semiconductor, oil extraction technology, nanotechnology etc.). This objective measure, or technology value index, may be based on a cumulative value index, or performance metric, of the underlying basket of patents composing that particular technology. In one embodiment, the forum may calculate such metrics and establish a rule that derives the price of the financial contract from such metrics, as well as publish both the starting reference pool of patents and the rules by which the basket may change over time (e.g. the basket may admit newly issued patents or may lose patents no longer deemed essential to the technology). The price of a contract may be the product of a multiplier and the underlying technology value index. The multiplier may depend on the underlying technology, and may be pre-determined based on the underlying technology index's historic volatility (see, e.g., FIG. 4, described above). Sample contract specifications for a technology-based futures contract, which may be created by the forum, is shown in FIG. 5.

For example, a technology-based contract may cash settle to the underlying technology index's value at the close of market trading on the last Tuesday of the contract month, then a new contract will open, with contract months being every quarter. Margin rules may be set by the exchange and subject to change based on the volatility of the underlying technology index. For example, if the Oil Extraction Technology index is at 3,000, and a futures contract multiplier is 10, the value of the contract is $30,000. If the Oil Technology index re-prices at 3,025, the value of the futures contract is $30,250, and the buyer, long one futures contract, has gained $250. Technology-based financial contracts is described in U.S. provisional application No. 60/887,575, filed Jan. 31, 2007, entitled "Technology-Based Financial Instruments", the entire disclosure of which is hereby incorporated herein by reference.

In one embodiment, the forum also publishes license rights for trading through the exchange, with the forum functioning a master licensing agent for the license rights, offering a specific quantity of non-exclusive and extinguishable sublicense rights on behalf of a master grantor. Each issuer, in conjunction with the forum and an approved lead underwriter, may decide on the quantity of license rights for a given intangible asset (e.g., a patent) or asset pool (e.g., a pool of patents) to be offered, the pricing of each traunche of a given license rights, and, if applicable, conditions under which the issuer may elect to issue additional license rights. On a semi-annual basis or more frequently, buyers of a given license right issue may submit to the forum audited use of purchased license rights within 45 days of the close of the reporting period. The forum may report to market participants or potential investors the number of license rights that have been used, the number of license rights that have been purchased and not used, and the remaining license rights available for purchase. In the event that a buyer of license rights elects to resell unused license rights of a given issue, the buyer may submit to the forum audited use of the total license rights purchased prior to being approved to resell the unused license rights. Audited, unused license rights may only be sold to qualified participants of the exchange having a trading right. Description of trading of license rights is described in U.S. patent application Ser. No. 11/405,166, filed Apr. 17, 2006, the entire disclosure of which is hereby incorporated herein by reference.

Figure 6:
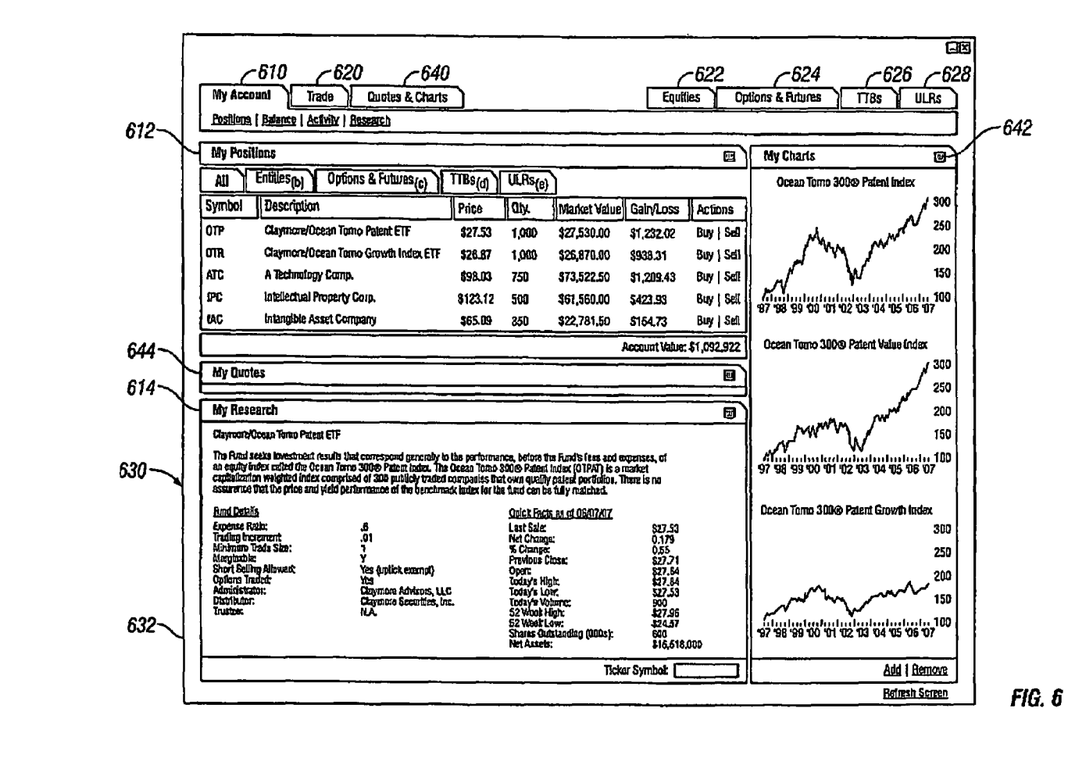
FIG. 6 is a schematic of a graphical user interface of a computer system for electronic trading of financial products on a viral marketplace, in accordance with an embodiment of the present invention.

FIG. 6 illustrates an embodiment of a display unit 630 of computer system 300, having an exemplary graphical user interface 632 for facilitating electronic trading of financial products on a virtual marketplace and/or reporting of transactional data relating to the trading of products on an exchange or off the exchange, in accordance with an embodiment of the present invention. A software application for implementing the methods described herein for trading intangible assets and their derivatives may be configured to include appropriate execution of the exemplary features described herein with reference to graphical user interface 632, as would be apparent to one skilled in the relevant art(s). In the embodiment of FIG. 6, a user, which may be a market participant qualified to trade on a marketplace of the present invention, may select several tabs 610, 620, 640 to allow investigation (tab 640) of products published on the marketplace, review reporting of transactions and permit execution of trades (tab 620), and provide a personal portfolio interface (tab 610). The participant may also review prospectuses of products published for trading on/off the exchange, which may be available via categorized tabs, such as tabs 622, 624, 626, and 628. Tab 622 may provide prospectuses of traditional equities of listed and/or traded companies, ETFs tied to intangible asset indices, etc. Tab 624 may provide prospectuses on options and futures contracts deriving their value from intangible assets. Tabs 626 and 628 may provide direct access to prospectuses of popular financial products. For example, tab 626 may provide prospectuses of technology-based future contracts, and tab 628 may provide prospectuses of license rights. In FIG. 6, the interface of tab 610 is shown, and includes a section 612 summarizing products the participant has in their personal portfolio. The participant may view (a) "all" products, or restrict the display to view their portfolio by product categories (b)-(e) that correspond to categories of tabs 622, 624, 626 and 628. Each tab (a)-(e) may provide an interface that allows the participant to execute trades (buy or sell) of products in their personal portfolio. The interface of tab 610 may further include a section 644 for showing quotes on potential investment opportunities, a section 614 showing an overview of a financial product that the participant desires to monitor, and a section 642 showing one or more charts, such as trends of intangible asset indices (shown), trends of value metrics for intangible assets underlying financial contract(s) (e.g., FIG. 4), and/or trends of monitored financial products or specific products in the personal portfolio.

While a particular form of the invention has been illustrated and described, it will be apparent that various modifications can be made without departing from the spirit and scope of the invention. For example, it will be apparent to those skilled in the relevant art(s), after reading the description herein, that patent rating scores may be obtained from patents issued by other national/regional patent offices (EPO, JPO, etc.) in lieu or in addition to scores for U.S. patents. For the purposes of illustration, the concepts related to derivative financial contracts for trading through a marketplace of the present invention have been largely presented in the context of patents. However, it should be appreciated that similar contacts may be created to hedge and manage risk and gain price exposure to other forms of intangible assets and, in particular, intellectual property, without departing from the scope of the present invention. For example, similar tradable derivative financial contracts can also be implemented with underlying intangible assets such as copyrights, domain names, trademarks, know-how, and trade secrets. Further, a marketplace in accordance with the present invention may embrace trading of national entities of a particular country and/or multinational entities, their intangible assets and/or derivatives of their intangible assets, Therefore, the breadth and scope of the present invention should not be limited by any of the above-described exemplary embodiments, but should be defined only in accordance with the following claims and their equivalents.

What is claimed is:

1. A trading system method for trading one or more IP-focused products, comprising the steps of:
providing a communication infrastructure by which transactions involving one or more IP-focused products of one or more entities listed on the trading system are facilitated, the communication infrastructure comprising a processor and a display unit;
identifying by the processor one or more potential entities for listing on the trading system;
utilizing the processor to select the one or more entities from the one or more potential entities for listing on the trading system through the use of listing criteria, wherein said utilizing step further comprises the step of measuring by the processor a patent portfolio for each of the one or more potential entities using IP metrics to provide a patent portfolio value, said listing criteria consisting of: an average intellectual property quotient score forecasting an economic return value of each patent in the patent portfolio calculated by comparing a characteristic of each patent in the patent portfolio to that characteristic in a set of other patents, a patent maintenance value, and a patent exchange value;
selecting by the processor the one or more entities from the one or more potential entities based on the patent portfolio value to obtain one or more listed entities;
listing by the processor the one or more listed entities on the trading system;
evaluating by the processor the one or more listed entities for continued fulfillment of the listing criteria in order for the one or more listed entities to remain listed on the trading system, wherein the one or more listed entities remain listed on the trading system when the IP metrics are satisfied;
processing by the processor one or more value metrics to assign a product value to the one or more IP-focused products of the one or more listed entities;
publishing by the processor to a display unit the one or more IP-focused products including the product value of the one or more listed entities; and
facilitating by the processor a sale, a purchase, or a license of the one or more IP-focused products of the one or more listed entities.

2. The trading system method of claim 1, further comprising the step of purchasing the one or more IP-focused products.

3. The trading system method of claim 1, further comprising the step of defining a procedure for trading the one or more IP-focused products.

4. The trading system method of claim 1, further comprising the step of reporting transactional data relating to the one or more IP-focused products.

5. The trading system method of claim 1, wherein said publishing step further includes the step of reporting periodically the product value of the one or more IP-focused products.

6. The trading system method of claim 1, wherein said offering step further comprises the step of presenting the one or more IP-focused products over-the-counter.

7. The trading system method of claim 1, further comprising the step of providing a graphical user interface for executing a trade of the one or more IP-focused products.

8. The trading system method of claim 7, wherein the graphical user interface includes an investigation tab for examination of the one or more IP-focused products.

9. The trading system method of claim 7, wherein the graphical user interface includes a portfolio tab for access to an investor portfolio interface.

10. The trading system method of claim 1, wherein the one or more IP-focused products is one or more derivative financial contracts.

11. The trading system method of claim 10, wherein said one or more derivative financial contracts is based on a plurality of intangible assets of a single entity.

12. The trading system method of claim 10, wherein said one or more derivative financial contracts is based on a plurality of intangible assets of a plurality of entities.

13. The trading system method of claim 10, wherein said one or more derivative financial contracts is one or more futures contracts.

14. The trading system method of claim 10, wherein said one or more derivative financial contracts is one or more forward contracts.

15. The trading system method of claim 1, wherein the one or more value metrics includes a variable multiplier.

16. The trading system method of claim 1, wherein said one or more listed entities is a company.

17. The trading system method of claim 1, wherein the patent maintenance value is calculated by the processor from maintenance data to obtain a statistical probability that each patent in the patent portfolio will be maintained.

* * * * *